US010387710B2

(12) United States Patent
Chen et al.

(10) Patent No.: US 10,387,710 B2
(45) Date of Patent: Aug. 20, 2019

(54) IMAGE SENSING WITH A WAVEGUIDE DISPLAY

(71) Applicant: Microsoft Technology Licensing, LLC, Redmond, WA (US)

(72) Inventors: Liying Chen, Redmond, WA (US); Yan Cheng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/282,434

(22) Filed: Sep. 30, 2016

(65) Prior Publication Data

US 2017/0255813 A1 Sep. 7, 2017

Related U.S. Application Data

(60) Provisional application No. 62/304,889, filed on Mar. 7, 2016.

(51) Int. Cl.
*F21V 8/00* (2006.01)
*G02B 5/32* (2006.01)
(Continued)

(52) U.S. Cl.
CPC ........... *G06K 9/00033* (2013.01); *G02B 5/32* (2013.01); *G02B 6/0015* (2013.01);
(Continued)

(58) Field of Classification Search
CPC ..... G06K 9/00046; G06K 2009/00932; G06K 9/00006
(Continued)

(56) References Cited

U.S. PATENT DOCUMENTS 4,728,186 A 3/1988 Eguchi et al.
5,319,182 A 6/1994 Havens et al.
(Continued)

FOREIGN PATENT DOCUMENTS

EP 0609812 A1 8/1994
EP 942583 A1 9/1999
(Continued)

OTHER PUBLICATIONS

Sansosti, Tanya M., "LED's as Detectors", In Stony Brook University, Laser Teaching Center, Optics Rotation Project 2, Jan. 1, 2002, 8 Pages.
(Continued)

*Primary Examiner* — Yosef Kassa
(74) *Attorney, Agent, or Firm* — Holzer Patel Drennan

(57) ABSTRACT

An electronic device includes an image sensing display. The display includes a cover glass and is configured as a waveguide. A volume holographic grating in the display diffracts incident light from an object positioned outside the display. The diffracted incident light has an angle of incidence relative to the volume holographic grating that satisfies the Bragg condition. The volume holographic grating diffracts the incident light through the waveguide at a predetermined angle and with a predetermined waveguide exit distance to focus at the image sensor. An image sensor is positioned at an output of the waveguide to capture the diffracted incident light propagated through the waveguide. Image processing circuitry is coupled to the image sensor to recognize a fingerprint image captured by the image sensor through the waveguide.

20 Claims, 7 Drawing Sheets

(51) Int. Cl.
*G02B 6/34* (2006.01)
*G03H 1/02* (2006.01)
*G06K 9/00* (2006.01)

(52) U.S. Cl.
CPC ............. *G02B 6/0026* (2013.01); *G02B 6/34* (2013.01); *G03H 1/0248* (2013.01); *G06K 9/00046* (2013.01); *G03H 2222/45* (2013.01); *G03H 2260/12* (2013.01)

(58) Field of Classification Search
USPC ....... 382/115, 116, 124, 209, 210, 278, 282; 340/5.53, 5.83
See application file for complete search history.

(56) References Cited

U.S. PATENT DOCUMENTS 5,808,729 A 9/1998 Sugawara et al.
5,929,845 A 7/1999 Wei et al.
6,057,639 A 5/2000 May et al.
6,333,753 B1 * 12/2001 Hinckley ............ G06F 3/03543 345/156
6,885,439 B2 4/2005 Fujieda
6,927,384 B2 * 8/2005 Reime ................ G06F 3/03547 250/221
6,948,820 B2 * 9/2005 Veligdan ................. G02B 6/08 348/804
7,366,331 B2 4/2008 Higuchi
7,705,835 B2 * 4/2010 Eikman ................ G06F 3/0425 178/18.01
7,728,959 B2 * 6/2010 Waldman ........... G06K 9/00046 356/71
7,834,988 B2 11/2010 Bahuguna
7,849,024 B2 * 12/2010 Lee .......................... G06T 5/00 382/155
8,204,284 B2 6/2012 Wu
8,207,946 B2 * 6/2012 Abileah ............. G02F 1/13338 178/18.01
8,276,816 B2 10/2012 Gardner
8,354,640 B2 * 1/2013 Hamre ................. G02F 1/1326 250/338.1
8,441,422 B2 * 5/2013 Abileah ............. G02F 1/13338 345/102
8,441,442 B2 * 5/2013 Sato ....................... A63F 13/10 345/158
8,538,095 B2 * 9/2013 Fedele ............... G06K 9/00046 382/124
8,553,014 B2 * 10/2013 Holmgren ............ G06F 3/0421 345/173
8,570,449 B2 * 10/2013 Abileah ............. G02F 1/13338 345/173
8,581,884 B2 * 11/2013 Fahraeus .............. G06F 3/0421 345/176
9,050,943 B2 * 6/2015 Muller ................. B60R 25/246
9,158,416 B2 * 10/2015 Eriksson .............. G06F 3/0421
9,811,711 B2 11/2017 Huang et al.
2002/0118865 A1 8/2002 Hosokawa
2003/0118219 A1 6/2003 Higuchi et al.
2004/0196253 A1 10/2004 Eichenlaub
2004/0252867 A1 12/2004 Lan et al.
2004/0263069 A1 12/2004 Yamazaki et al.
2005/0063571 A1 3/2005 Setlak et al.
2005/0133762 A1 6/2005 Lee et al.
2005/0199857 A1 9/2005 Lee et al.
2007/0206248 A1 9/2007 Winterbottom et al.
2007/0252005 A1 11/2007 Konicek
2008/0073424 A1 3/2008 Ni
2008/0121442 A1 5/2008 Boer et al.
2009/0039241 A1 2/2009 Ueki
2009/0153926 A1 6/2009 Wiltshire et al.
2011/0057866 A1 3/2011 Konicek
2012/0188171 A1 7/2012 Alameh et al.
2012/0311719 A1 12/2012 Hamann et al.
2013/0032914 A1 2/2013 Iwasaki
2013/0127980 A1 5/2013 Haddick et al.
2013/0287272 A1 10/2013 Lu et al.
2014/0003683 A1 1/2014 Vieta et al.
2014/0063049 A1 3/2014 Armstrong-Muntner
2014/0133715 A1 5/2014 Ballard et al.
2014/0225838 A1 8/2014 Gupta et al.
2014/0226879 A1 8/2014 Westerman et al.
2014/0355846 A1 12/2014 Lee et al.
2015/0016695 A1 1/2015 Yoon
2015/0036065 A1 2/2015 Yousefpor et al.
2015/0135108 A1 5/2015 Pope et al.
2015/0139511 A1 5/2015 Yoon et al.
2015/0181059 A1 6/2015 Hu
2015/0243722 A1 8/2015 Kwon et al.
2015/0286306 A1 10/2015 Abrams et al.
2015/0348504 A1 12/2015 Sakariya et al.
2015/0364107 A1 12/2015 Sakariya et al.
2016/0078270 A1 3/2016 Lee et al.
2016/0092718 A1 3/2016 Jensen et al.
2016/0224816 A1 8/2016 Smith et al.
2016/0247010 A1 8/2016 Huang et al.
2016/0266279 A1 9/2016 Aurongzeb et al.
2017/0079591 A1 3/2017 Gruhlke et al.

FOREIGN PATENT DOCUMENTS

EP 1271389 A2 1/2003
EP 2328178 A2 6/2011
KR 20050000455 A 1/2005
WO 02065752 A1 8/2002
WO 2011110821 A1 9/2011
WO 2016119492 A1 8/2016

OTHER PUBLICATIONS

Baddi, Raju, "Use LEDs as Photodiodes | EDN", Retrieved from <<http://www.edn.com/design/led/4363842/Use-LEDs-as-photodiodes >>, Nov. 18, 2010, 6 Pages.
Rutz, Alexander, "LED—Is using a Display Panel as a Light Sensor Conceivable?—Electrical Engineering Stack Exchange", Retrieved from <<https://electronics.stackexchange.com/questions/138348/is-using-a-display-panel-as-a-light-sensor-conceivable>>, Nov. 13, 2014, 2 Pages
"International Search Report and Written Opinion Issued in PCT Application No. PCT/US2017/019803", dated Jun. 1, 2017, 12 Pages.
"International Search Report & Written Opinion Issued in PCT Application No. PCT/US2017/019802", dated Jun. 2, 2017, 13 Pages.
International Search Report and Written Opinion Issued in PCT Application No. PCT/US2017/019812, dated Jul. 13, 2017, 14 Pages.
Shikai et al., "Fingerprint Sensor Using Fiber Optic Faceplate", Proceedings of SPIE 2932, Human Detection and Positive Identification: Methods and Technologies, Jan. 28, 1997, 2 pages.
Xia et al., "Innovations in Fingerprint Capture Devices", Proceedings of Pattern Recognition, Feb. 2003, 9 pages, vol. 36, Issue 2.
Davide Maltoni, "Fingerprint Recognition—Sensing, Feature Extraction and Matching", Summer School for Advanced Studies on Biometrics: Autentication and Recognition, Jun. 2-6, 2003, 17 pages.
Jean-Francois Mainguet, "Fingerprint Sensing Techniques", Jul. 29, 2010, available at: http://fingerchip.pagesperso-orange.fr/biometrics/types/fingerprint_sensors_physics.htm#electro-optical.
"A Fingerprint Scanner That Can Capture Prints From 20 Feet Away: Opening doors with the save of a hand", published on Jun. 25, 2012, available at: http://www.popsci.com/technology/article/2012-06/fingerprint-scanner-captures-prints-20-feet-away.
Holz et al., "Fiberio: A Touchscreen that Senses Fingerprints", Proceedings of the 26th Annual ACM Symposium on User Interface and Technology, Oct. 8, 2013, 10 pages.
Pratap, Ketan, "Samsung Galaxy S5 said to come with fingerprint sensor, hovering touch feature", Published on: Jan. 21, 2014,

(56) References Cited

OTHER PUBLICATIONS

Available at: http://gadgets.ndtv.com/mobiles/news/samsung-galaxy-s5-said-to-come-with-fingerprint-sensor-hovering-touch-feature-473581.

Ifeanyi, et al., "A Dual System Capture Biometric Fingerprint Scanner", In International Journal of Engineering and Computer Science, vol. 4, Issue 12, Dec. 2015, pp. 15213-15219.

Tweedie, Steven, "Apple files for a patent to move its fingerprint scanner from the home button to underneath the touchscreen", Published on: Feb. 9, 2015, Available at: http://www.businessinsider.in/Apple-files-for-a-patent-to-move-its-fingerprint-scanner-from-the-home-button-to-underneath-the-touchscreen/articleshow/46179357.cms.

"RVH Technology: Specialist Photopolymer HOE R&D Company", Published on: Mar. 2015, Available at: https://www.reconnaissance.net/holography-news/issues/march-2015/.

"Jenetric sensor combines user display, fingerprint area", Published on: Sep. 24, 2015, Available at: http://www.planetbiometrics.com/article-details/i/3553/.

Kwon, et al., "A Three-Terminal n+-p-n+ Silicon CMOS Light-Emitting Device for the New Fully Integrated Optical-Type Fingerprint Recognition System", In Journal of Display Technology, vol. 12, Issue 1, Jan. 2016, pp. 77-81.

Whitwam, Ryan, "Qualcomm's new fingerprint sensor uses ultrasonic waves, could be built into screens", Published on: Jan. 7, 2016, Available at: http://www.extremetech.com/mobile/220598-qualcomms-new-fingerprint-sensor-uses-ultrasonic-waves-could-be-built-into-screens.

"Fingerprint Cards launches touch fingerprint sensor under cover glass", Published on: Feb. 18, 2016, Available at: http://www.fingerprints.com/blog/2016/02/18/fingerprint-cards-launches-touch-fingerprint-sensor-under-cover-glass/.

Huang, et al., U.S. Appl. No. 15/221,418, "Image Sensing With a Display", filed Jul. 27, 2016.

Huang, et al., U.S. Appl. No. 15/221,472, "Pixel Having a Photoemitter and a Photodetector Triggered by a Pixel Selector Signal Bus", filed Jul. 27, 2016.

Huang, et al., U.S. Appl. No. 15/221,494, "Triggered Image Sensing With a Display", filed Jul. 27, 2016.

International Search Report & Written Opinion Issued in PCT Application No. PCT/US2016/016250, dated Apr. 22, 2016, 10 Pages.

International Searching Authority, U.S. Patent and Trademark Office, Second Written Opinion of the International Preliminary Examining Authority for PCT/US2016/016250 dated Jul. 6, 2016, 5 pages.

"Non-Final Office Action Issued in U.S. Appl. No. 14/628,293", dated Feb. 9, 2017, 9 Pages.

"International Preliminary Report on Patentability Issued in PCT Application No. PCT/US2016/016250", dated Sep. 28, 2016, 6 Pages.

* cited by examiner

IMAGE SENSING WITH A WAVEGUIDE DISPLAY

CROSS-REFERENCE TO RELATED APPLICATIONS

The present application claims benefit of priority to U.S. Provisional Patent Application No. 62/304,889, entitled "Off-surface Fingerprint Sensing" and filed on Mar. 7, 2016, which is specifically incorporated by reference for all that it discloses and teaches.

BACKGROUND

Fingerprint sensing systems for use with computing devices may employ a variety of technologies, including capacitive sensing, lensed digital cameras, etc. However, such solutions come with significant limitations. For example, bezel-less or very small bezel devices do not leave sufficient area for fingerprint detection components outside of the display area. Furthermore, capacitive sensing is very sensitive to the distance between the finger and the capacitive sensor, such that the cover glass of a display of a computing device may dramatically reduce the effectiveness of the capacitive sensing resolution if the capacitive sensing components are positioned beneath the display. Lensed digital cameras tend to be bulky and expensive. Many such solutions also tend to be difficult to scale in area across the computing device front face or display.

SUMMARY

The described technology provides an image sensing capability in a display of an electronic device wherein an image of an object can be detected without the object being in contact with a surface of the display, referred to herein as "off-surface image sensing." It should be understood, however, that the same or similar image sensing capability can also sense the image of the object if the object is in contact with the surface of the display. Using the display, including a cover glass, as a waveguide, light received from the object can be transmitted through the waveguide display to an image sensor within the electronic device.

An electronic device includes an image sensing display. The display includes a cover glass and is configured as a waveguide. A volume holographic grating in the display diffracts incident light from an object positioned outside the display. The diffracted incident light has an angle of incidence relative to the volume holographic grating that satisfies the Bragg condition. The volume holographic grating diffracts the incident light through the waveguide at a predetermined angle and with a predetermined waveguide exit distance toward the image sensor. An image sensor is positioned at an output of the waveguide to capture the diffracted incident light propagated through the waveguide. Image processing circuitry is coupled to the image sensor to recognize a fingerprint image captured by the image sensor through the waveguide.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

Image sensing with a waveguide display can provide a thin image capture system for electronic devices by using a thin display assembly as a waveguide to an image capture device. Although images of various objects may be captured using such a system, one example implementation of such an image sensing system includes a fingerprint sensor (e.g., for verifying identity of a user). Fingerprint sensors may be used to authenticate a user, electronically sign a document or other data, authorize a purchase, etc. In addition, off-surface fingerprint sensing, which can accurately sense a fingerprint within several millimeters from a display or sensing surface, can lead to faster logins (e.g., a mobile device can authenticate a user and initiate the login process before the user's finger even contacts the device) and promote more hygienic computing (e.g., no physical contact required with a potentially dirty or infectious fingerprint sensing surface, such as at an automated teller machine or a doctor's office).

Figure 1:
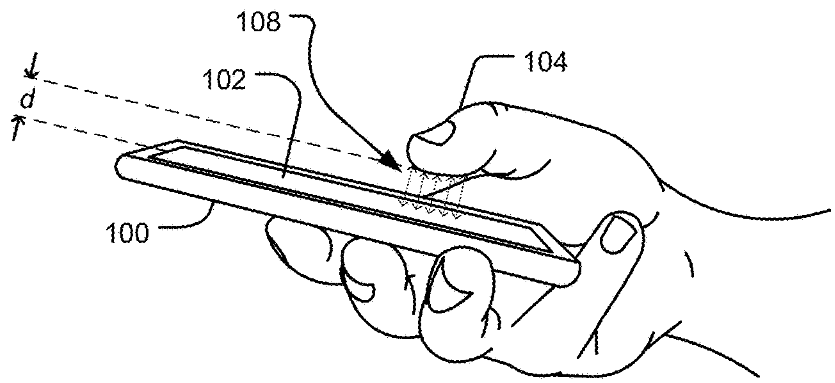
FIG. 1 illustrates an example electronic device providing image sensing with a waveguide display.

FIG. 1 illustrates an example electronic device 100 providing image sensing with a waveguide display 102. In the scenario illustrated in FIG. 1, the image is shown as including features on an object (e.g., ridges and valleys on a pad of user's thumb 104—a fingerprint), although images of other objects may be captured using the described technology.

Light 108 emitted from the waveguide display 102 and potentially ambient light are reflected off the pad of the user's thumb 104 (e.g., an example object) through a cover glass of the waveguide display 102. In FIG. 1, the pad of the user's thumb 104 is separated from the surface of the waveguide display 102 by a distance d, wherein the distance d is in the range between zero millimeters and several millimeters (e.g., 10 mm, in one example), hence the use of the term "off-surface image sensing." Longer distances may be achieved, for example, by increasing the intensity of illumination on the object, increasing the sensitivity of image capture sensors, etc. Nevertheless, it should also be understood that some implementations of the described technology can sense an image of an object in contact with the surface of the waveguide display 102 (e.g., d equals zero).

Although an example of a fingerprint sensing implementation is described in the present application, other implementations may employ the described technology, including motion detectors, facial or pattern recognition, gesture recognition, proximity sensing, image capture, document scanning, etc. In some implementations, the light emitted by the display may be sufficient to allow the image sensing system to capture an image of an object with sufficient resolution to obtain a useful image, such as for pattern recognition or optical character recognition. In other implementations, ambient lighting (including backlighting) may enhance (or in some examples, degrade) the image sensing fidelity of the system.

As the light 108 reflected off the pad of the user's thumb 104 propagates to and through the surface of the waveguide display 102, some portion of the reflected light impinges a volume holographic grating within the waveguide display 102 (e.g., affixed to/bonded to the surface of the cover glass that is opposite the display surface of the waveguide display 102). The volume holographic grating may be positioned (e.g., sandwiched) between the cover glass and a transparent or translucent substrate, although other configurations may be employed.

When a propagating light wave strikes a refractive interface (such as between a cover glass and an underlying substrate), the light wave's interaction with that interface can vary depending on the relative refractive indices of the materials on each side of the refractive interface and on the wave's angle of incidence (i.e., the angle at which the light wave strikes the refractive interface with respect to the normal to that interface). Bragg diffraction occurs when incident light is diffracted by a periodic structure (e.g., a volume holographic grating), made by transmission or refractive index modulation, and undergoes constructive interference. The constructive interference causes the diffracted light waves to remain in phase when the incident light wave and the diffracted light wave satisfy the Bragg condition. According to Bragg's Law, constructive interference is strongest when $2d \cos \theta = n\lambda$ (the Bragg condition) is satisfied, where n is a positive number, d is the periodic distance (e.g., of the diffraction grating fringes), $\lambda$ is the wavelength of the incident light wave, and $\theta$ is the incident angle.

If the light wave's angle of incidence is less than the critical angle $\theta$ of the refractive interface, some of the light wave will pass through the refractive interface and some of the light wave will be reflected back into the display. (The critical angle $\theta$ is dependent upon the relative refractive indices of the materials on each side of the refractive interface, according to Snell's Law.) If the angle of incidence precisely equals the critical angle $\theta$, then the light wave is refracted along the refractive interface. If the angle of incidence is greater than the critical angle $\theta$, then the entire light wave is reflected back into the display without transmission through the refractive interface, according to the principle of total internal reflection (TIR).

In the illustrated implementation, the volume holographic grating diffracts the incident light 108 via refractive index modulations within a thin layer of grating material sandwiched between two display system layers. The incident light 108 is diffracted at angles corresponding to the Bragg condition as a function of the incident angle and the orientation and frequency of the index modulation in the grating. The diffraction efficiency, however, is a strong function of the relationship between the angle of incidence and the angle of diffraction with respect to the fringes formed by the refractive index modulations within the volume of the grating. If the angle of incidence and the volume holographic grating satisfy the Bragg condition, which also depends on the depth of the grating volume and on the modulation depth of the grating fringes, then high peak diffraction efficiencies, approaching 100%, are possible. Grating performance is often characterized by its refractive index variation ($\Delta n$) over the grating's area, the grating thickness, and the grating vector—the orientation and the frequency between consecutive fringes of the grating.

In one implementation, a volume holographic grating includes a diffraction grating manufactured using a technique employing a holographic interference pattern. Two intersecting laser beams yield interference fringes that are projected onto a photopolymer film that is deposited on the volume holographic grating substrate. In the photopolymer film, photopolymerization occurs to change changes the diffraction grating's index in proportion to the intensity of the fringes resulting in a volume holographic grating.

Impinging light waves (referred to as incident waves) having an angle of incidence with the volume holographic grating that satisfies the Bragg condition are diffracted into the waveguide display 102. The diffraction angle is designed to exceed the Total Internal Reflection (TIR) angle of the waveguide display 102. The diffracted waves exit the volume holographic grating to propagate within the waveguide display 102 via TIR to an image sensor (e.g., a camera). The image sensor captures the diffracted waves as an image of the object (e.g., a pad of the user's thumb 104) from which the incident waves reflected.

Image sensing may be triggered in a variety of ways. In one implementation, a user is prompted to bring the object to be imaged within the proximity of a specific area of the waveguide display 102, such as by displaying a bright box in a region of the display and instructing the user to bring a finger close to the box. In another implementation, a proximity sensor in a certain region of the display may detect an object in close proximity to the display and trigger image sensing in that region of the display corresponding to the proximity signal. Some implementations may provide volume holographic grating (and therefore image sensing capability) in a small area of the waveguide display 102, while other implementations may provide a volume holographic grating across a large area of the waveguide display 102, including potentially the entire area of the waveguide display 102. Managing the triggering, duration, and area of image sensing at any particular time can influence power utilization within an electronic device.

In one implementation, such as that of a fingerprint scanner for accessing a processor system, image processing circuitry and software (not shown) evaluates the image to determine whether the image is recognized and is associated with authorization to access the device. Alternatively, the image processing circuitry and software may use the captured image to sign a document, data file, etc. In other implementations, the image processing circuitry and software can capture the image for a variety of uses, including without limitation, detecting an object positioned or hovering above a surface of a display or other electronic device component, distinguishing between a stylus and a palm at a surface of a display for palm rejection in an inking operation, etc.

In various implementations, the image sensing waveguide display may be used in combination with other sensors, such as a proximity sensor, a pressure sensor, a touch sensitive screen, a front-facing camera, and/or other device controls (e.g., buttons, audio input/output, selective illumination by the display). For example, a proximity sensor can trigger a change in display intensity in a defined area of the display in order to better illuminate the object of interest.

In yet another implementation, the volume holographic grating is manufactured by exposing photosensitive material on the volume holographic grating with light having a specific wavelength. When performing an image sensing operation, a light source in or behind the display panel is switched to emit light at that specific frequency to enhance the diffraction efficiency of the volume holographic grating. Example light sources may include without limitation light emitting elements (e.g., light emitting diodes), backlighting elements behind a liquid crystal display panel layer, etc.

Figure 2:
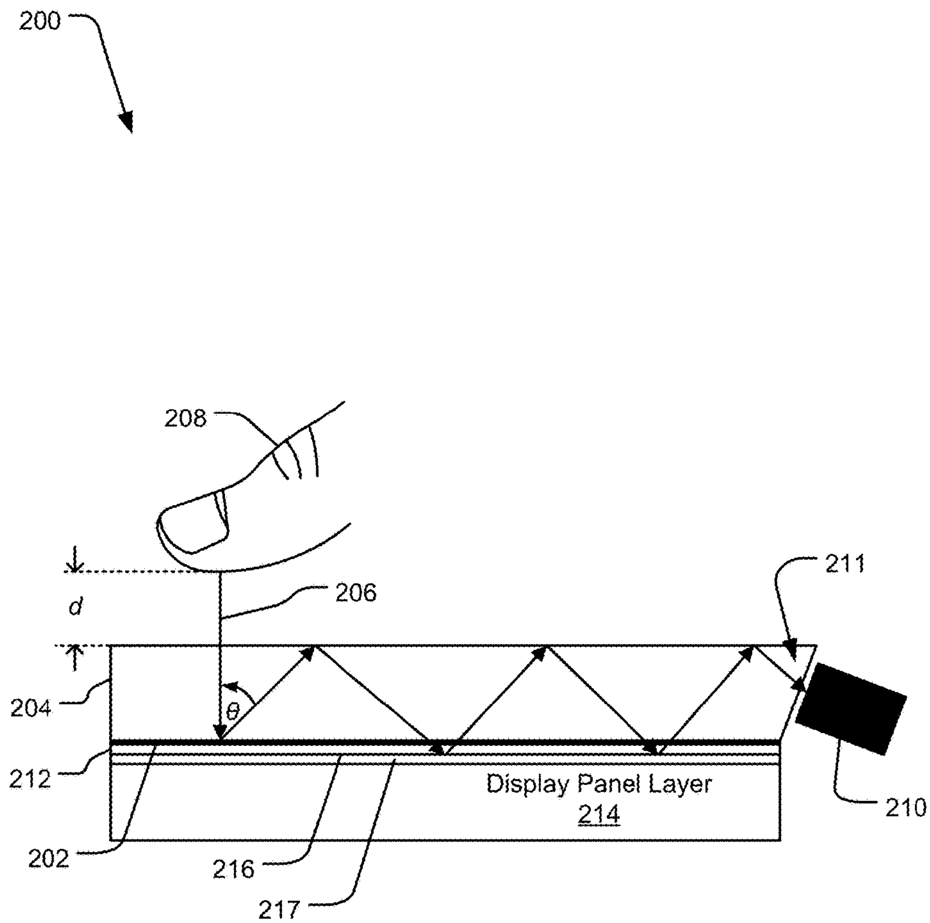
FIG. 2 illustrates an example image sensing system using a volume holographic grating for high angular selectivity and a display as a waveguide.

FIG. 2 illustrates an example image sensing system 200 using a volume holographic grating 202 for high angular selectivity and a display as a waveguide. A light wave 206 is reflected off the pad of a user's thumb 208, propagating through the waveguide display (including a cover glass 204 of the waveguide display). The waveguide display in FIG. 2 also includes a transparent or translucent substrate 212, a low index layer 217, and a display panel layer 214 is bonded to the substrate 212, forming a refractive interface 216.

The reflected light 206 impinges the volume holographic grating 202, which has been manufactured to yield an angle and a waveguide exit distance directing the reflected light 206 through the waveguide display toward the image capture sensor 210 (e.g., a camera). The waveguide exit distance represents the distance from the point of incidence on the volumetric holographic grating 202 to the light wave's exit point 211 from the waveguide display. In one implementation, one or more optical components, such as a lens, collect the light exiting the waveguide display and directs it to the image capture sensor 210. In another implementation, the image capture sensor 210 directly collects the light exiting the waveguide display. Other implementations are contemplated.

Waves of reflected light 206 that satisfy the Bragg condition relative to the volume holographic grating 202 are diffracted through the waveguide display, including the cover glass 204, to the image capture sensor 210. Other optical components (not shown), such as a lens, may be positioned in the optical path of the light exiting the waveguide. As such, the angle of refraction of the volume holographic grating 202 is designed to transmit the selectively-diffracted waves through the waveguide display in focus at the image capture sensor 210.

In one implementation, the diffracted light wave is reflected within the waveguide display at a refractive interface between the surface of the cover glass 204 and the interface between the substrate 212 and the low index layer 217 via total internal reflection. In another implementation, the substrate 212 is omitted and the diffracted light wave is reflected within the waveguide display at a refractive interface between the surface of the cover glass 204 and the interface between the cover glass 204 and the low index layer 217 via total internal reflection. Other implementations may be employed.

In the illustrated implementation, depending upon certain manufacturing parameters, the volume holographic grating 202 may selectively diffract collimated light waves, converging light waves, and/or diverging light waves. For example, in one implementation, the volume holographic grating 202 may be manufactured such that collimated light waves are selectively diffracted by the volume holographic grating 202, particularly light waves with incident angles that are substantially normal to the display surface of the cover glass. In such a configuration, the use of collimated light in the manufacture of the volume holographic grating 202 results in selective diffraction by the volume holographic grating 202 of light having a predominately normal angle of incidence with respect to the display surface.

In other implementations, the volume holographic grating 202 may be manufactured to selectively diffract converging and/or diverging light waves, such as light converging or expanding to the display surface. Such configurations can result in a demagnification or magnification, respectively, of the object as it gets closer to the display surface. Manufacturing of such configurations employs a converging or expanding light source to provide a reference light when creating the volume holographic grating.

In FIG. 2, the volume holographic grating 202 is show along the length of the waveguide display, but it should be understood that the volume holographic grating 202 may reside across the entire area of the waveguide display or at one or more select sub-areas of the waveguide display.

Figure 3:
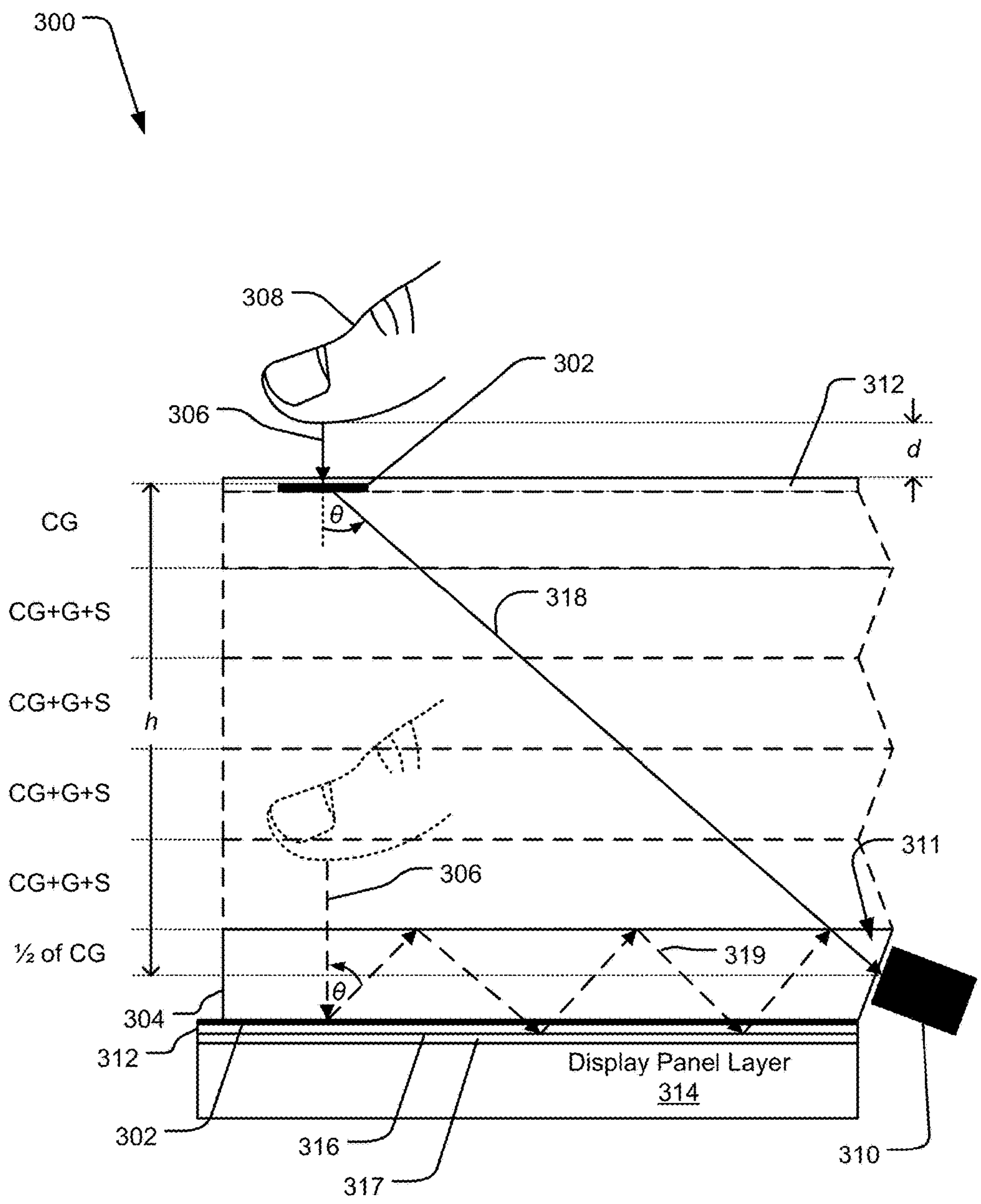
FIG. 3 illustrates an "unfolded" depiction of an example image sensing system using a volume holographic grating for high angular selectivity and a display as a waveguide.

FIG. 3 illustrates an "unfolded" depiction of an example image sensing system 300 using a volume holographic grating 302 for high angular selectivity and a display as a waveguide. The "unfolded" nature of the depiction in FIG. 3 is intended to show a straight-line equivalent 318 of an optical path 319 of light through the waveguide display. A light wave 306 is reflected off the pad of a thumb 308, propagating through the unfolded waveguide display, including a cover glass 304. The unfolded waveguide display in FIG. 3 also includes a transparent or translucent substrate 312, a low index layer 317, and a display panel layer 314 is bonded to the substrate 312, forming a refractive interface 316.

The reflected light 306 impinges the volume holographic grating 302, which has been manufactured to yield an angle and a waveguide exit distance directing the reflected light 306 through the waveguide to the image capture sensor 310 (e.g., a camera). The waveguide exit distance represents the distance from the point of incidence on the volumetric holographic grating 302 to the light wave's exit point 311 from the waveguide display. In one implementation, one or more optical components, such as a lens, collect the light exiting the waveguide display and directs it to the image capture sensor 310. In another implementation, the image capture sensor 310 directly collects the light exiting the waveguide display. Other implementations are contemplated.

Waves of reflected light 306 that satisfy the Bragg condition relative to the volume holographic grating 302 are diffracted through the waveguide display, including the cover glass 304, to the image capture sensor 310. Other optical components (not shown), such as a lens, may be positioned in the optical path 319 of the light exiting the waveguide. As such, the angle of refraction of the volume holographic grating 302 is designed to transmit the selectively-diffracted waves through the waveguide display in focus at the image capture sensor 310.

In one implementation, the diffracted light wave is reflected within the waveguide display at the refractive interface 316 between the surface of the cover glass 304 and the interface between the substrate 312 and the low index layer 317 via total internal reflection. In another implementation, the substrate 312 is omitted and the diffracted light wave is reflected within the waveguide display at a refractive interface between the surface of the cover glass 304 and the interface between the cover glass 304 and the low index layer 317 via total internal reflection. Other implementations may be employed.

The distance h represents the unfolded dimension of the waveguide display, wherein an optical path 319 of the folded light wave in the waveguide display has the same angle and length of the path 318 of the unfolded light wave. Depending on the number of reflective bounces within the waveguide display, the distance h is a sum of one or more cover glass thicknesses (CG), one or more grating thicknesses (G), and one or more remaining substrate thicknesses (S), wherein the remaining substrate thickness is the full thickness of the substrate minus the grating thickness (G). In the illustrated example (as shown along the left margin of FIG. 3), with six reflective bounces within the waveguide display, h equals $$\frac{1}{2}C+4(CG+G+S)+CG$$

The angle θ is set in the volume holographic grating 302 during manufacturing, such that the refraction angle and waveguide exit distance of the volume holographic grating 302 focus the reflected light waves 306 on the image sensor 310 after propagating through the waveguide display. The ½C component of the distance h accounts for the positioning of the image sensor 310 in the middle of the waveguide display (relative to the thickness of the waveguide display). The (CG+G) component of the distance h accounts for the exclusion of the substrate 312 from the refractive distance in the first fold of the unfolded path 318 (corresponding to the light initially diffracted from the volume holographic grating 302 by the folded path 319). The four (CG+G+S) components of the distance h account for the four bounces through the full thickness the waveguide display after the initial diffracted from the volume holographic grating 302. The distance h is a parameter in the manufacturing of the volume holographic grating 302 to obtain the desired waveguide exit distance corresponding to the waveguide display dimensions.

In FIG. 3, the volume holographic grating 302 is show along the length of the waveguide display, but it should be understood that the volume holographic grating 302 may reside across the entire area of the waveguide display or at one or more select sub-areas of the waveguide display.

Figure 4:
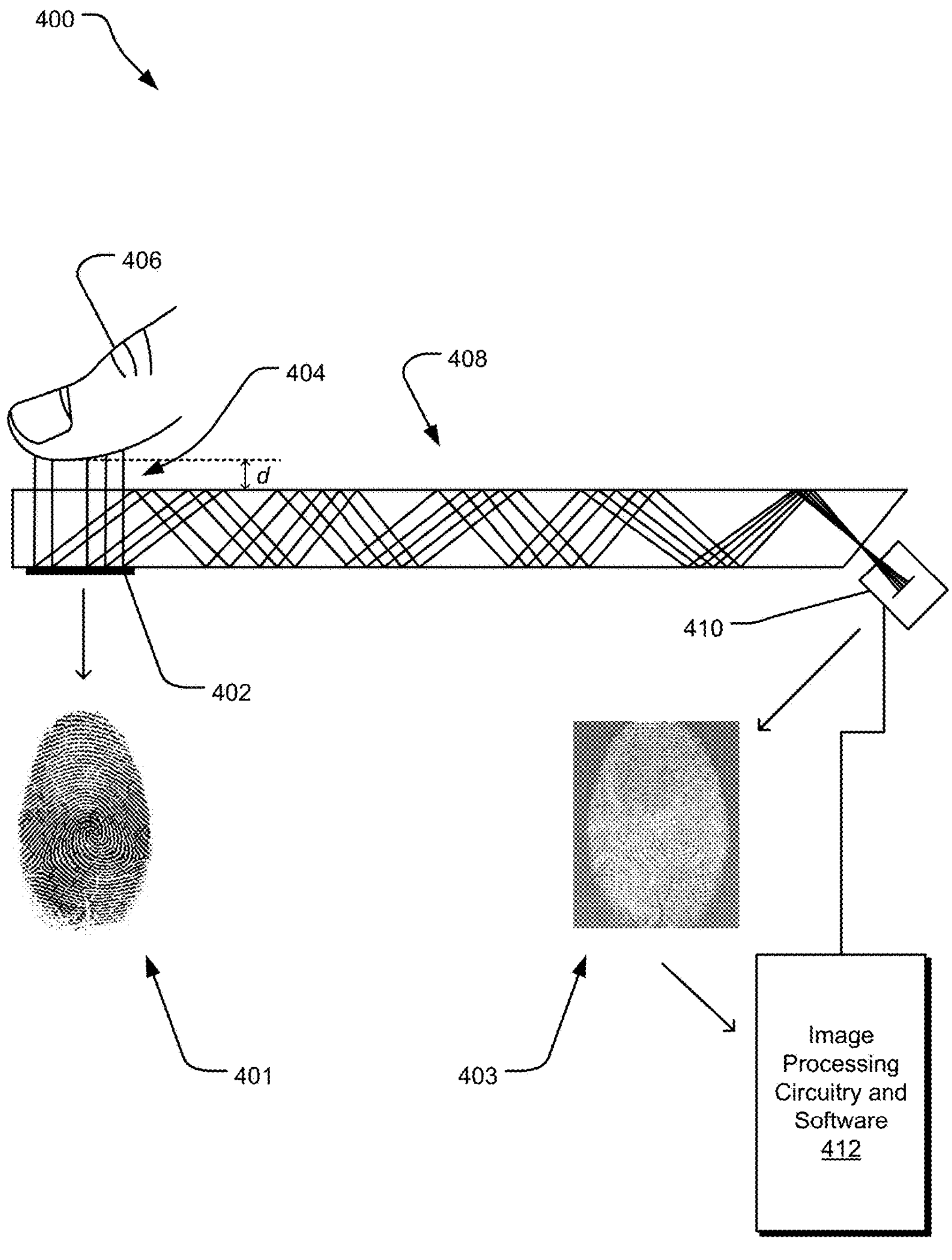
FIG. 4 illustrates use of a volume holographic grating in an example image sensing system.

FIG. 4 illustrates use of a volume holographic grating 402 in an example image sensing system 400. An image 401 represents an image of an example object, a fingerprint of a thumb 406. Multiple light waves 404 reflect off the pad of the thumb 406 and propagate through cover glass of a waveguide display 408. Such light waves 404 are captured with sufficient fidelity within a distance d from the display surface of the waveguide display 408. The light waves 404 diffract off the volume holographic grating 402 and propagate through the waveguide display 408 to focus on an image sensor 410. The distance din which sufficient fidelity is achievable is dependent upon the diffraction efficiency (e.g., angular selectivity) and the signal-to-noise ratio of the focused light at the image sensor. A resulting image 403 can be processed by image processing circuitry and software 412, as an example, for fingerprint recognition.

In FIG. 4, the volume holographic grating 402 is show along only a portion of the length of the waveguide display, but it should be understood that the volume holographic grating 402 may reside across the entire area of the waveguide display or at one or more select sub-areas of the waveguide display.

Figure 5:
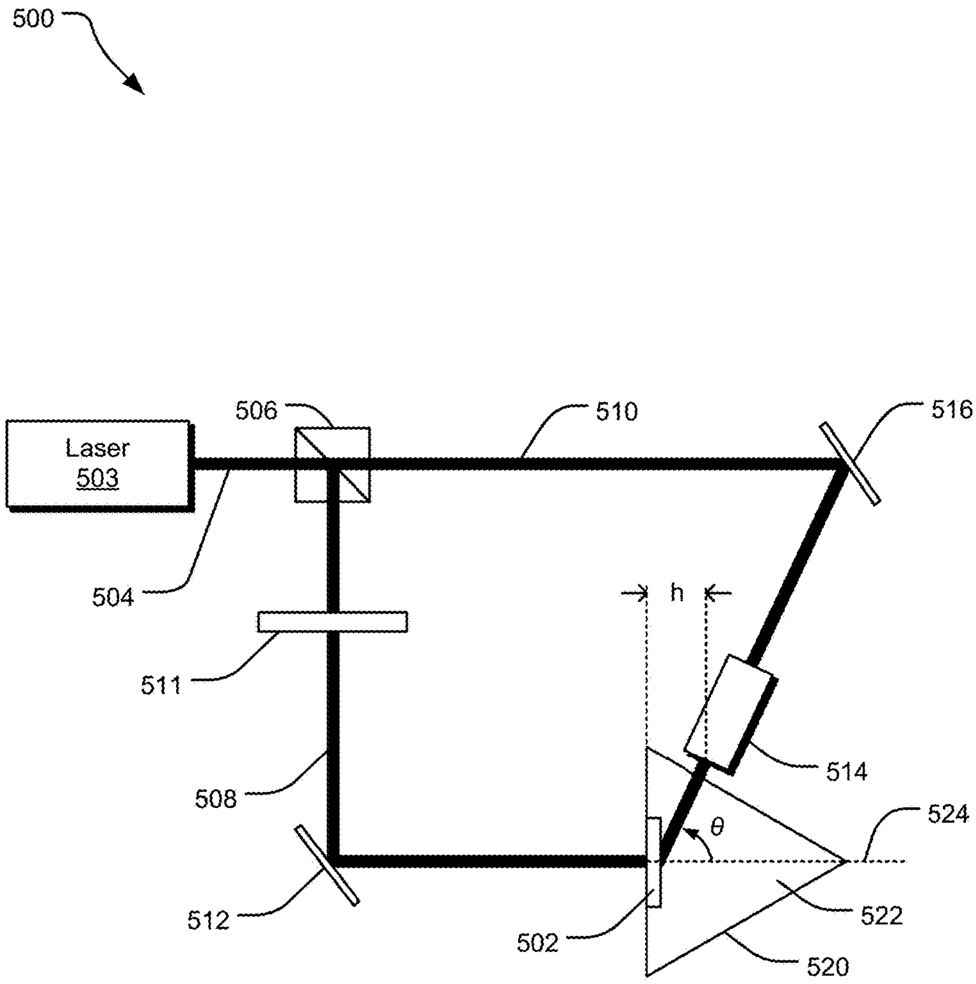
FIG. 5 illustrates an example system for creating a volume holographic grating for an example image sensing system.

FIG. 5 illustrates an example system 500 for creating a volume holographic grating 502 for an example image sensing system. Prior to patterning, the volume holographic grating 502 includes high index monomers in a matrix. The light-sensitive high index monomers are exposed to an interference light pattern from a reference light 508 and an object light 510, resulting in photo polymerization and subsequent diffusion of the residual monomers, to form a grating pattern in the volume holographic grating 502.

A light source, such as a laser 503, emits light 504 to a beam splitter 506. A first light wave, referred to as the reference light 508, propagates from the beam splitter 506 through a variable neutral density filter 511 to a mirror 512, which direct the reference light 508 at a substantially normal angle to the volume holographic grating 502 located in a prism 520 containing an index matching liquid 522. A second light wave, referred to as the object light 510, propagates from the beam splitter 506 to another mirror 516, which directs the object light 510 through an objective lens 514 and into the prism 520 to the volume holographic grating 502. Energies of the reference light 508 and the object light 510 couple within the volume holographic grating 502 to generate an interference pattern at the volume holographic grating 502. The light-sensitive high index monomers on the volumetric holographic rating 502 undergo photo polymerization and diffusion to create a diffractive element consisting of a periodic refractive index (n) throughout the volume of the volume holographic grating 502.

The distance h between the output of the objective lens 514 and the far side of the volume holographic grating 502 during the manufacturing process described with regard to FIG. 5 substantially corresponds to the distance h described with regard to FIG. 3. Accordingly, by controlling the distance h during the manufacture process of FIG. 5, the waveguide exit distance of the image sensing system within the waveguide display is controlled. Further, the angle of incidence θ of the object light 510 relative to the reference light 508 (as illustrated by the reference light axis 524) substantially corresponds with the diffraction angle of the volume holographic grating. Controlling this angle of incidence θ provides high angular selectivity in the diffraction of light into the waveguide display to the image sensor, thereby generating a high quality image.

Figure 6:
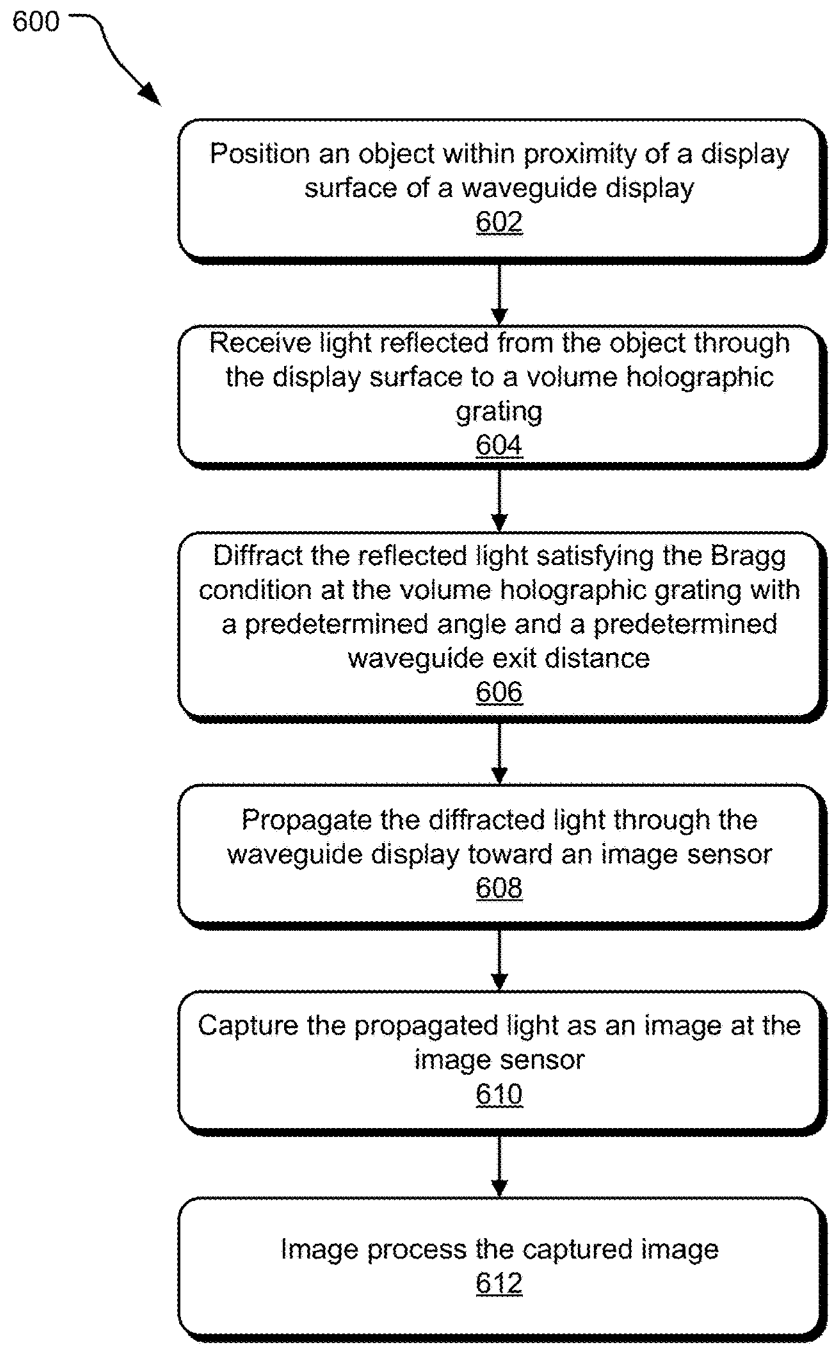
FIG. 6 illustrates example operations for using an image sensing system.

FIG. 6 illustrates example operations 600 for using an image sensing system. A positioning operation 602 positions an object within proximity of a display surface of a waveguide display of the image sensing system. The object may or may not be in contact with the display surface. A receiving operation 604 receives light reflected from the object through the display surface to a volume holographic grating of the waveguide display of the image sensing system. A diffraction operation 606 diffracts the reflected light that satisfies the Bragg condition at the volume holographic grating with a predetermined angle and a predetermined waveguide exit distance.

A propagation operation 608 propagates the diffracted light through the waveguide display toward an image sensor. The predetermined angle and the predetermined waveguide exit distance direct the diffracted light toward the image sensor. An image capture operation 610 captures the propagated light as an image at the image sensor. A processing operation 612 processes the image captured by the image sensor, such as by recognizing an image of a fingerprint, wherein the object is a pad of finger.

Figure 7:
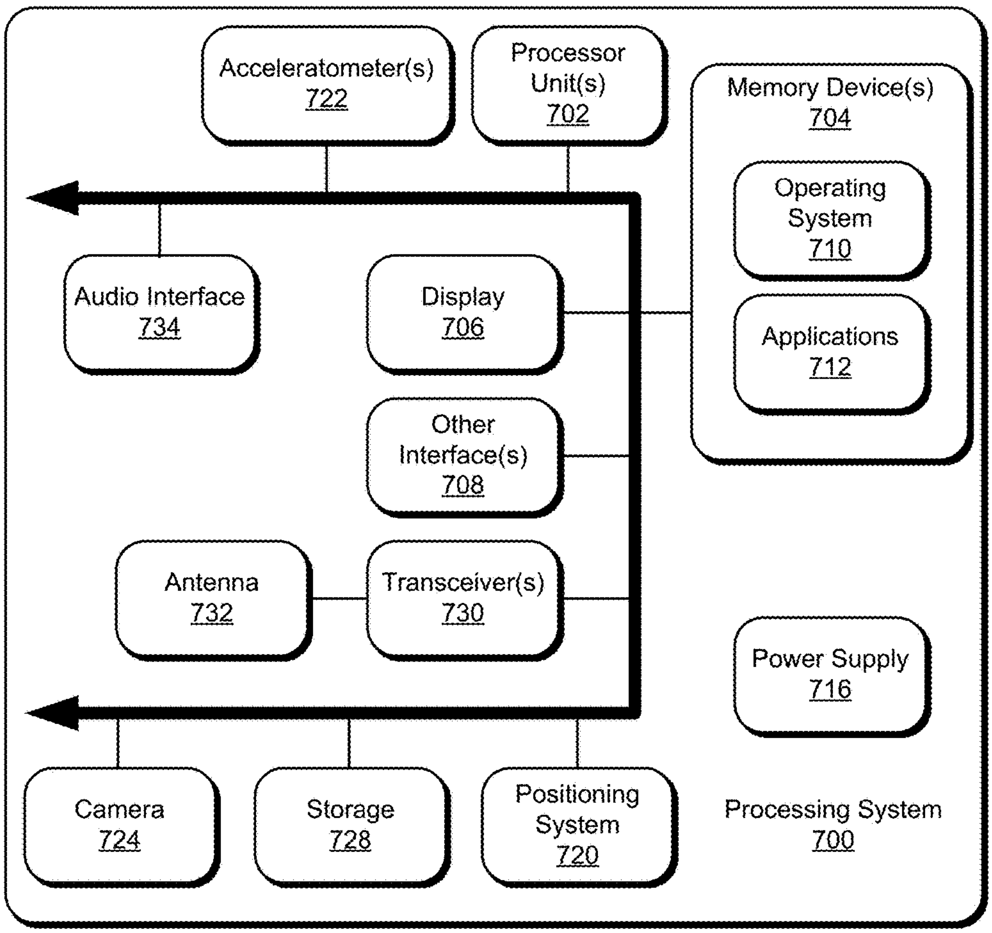
FIG. 7 illustrates an example processing system for use in image sensing with a waveguide display.

FIG. 7 illustrates an example processing system 700 for use in image sensing with a waveguide display 706. The processing system 700, such as an electronic device, includes one or more processor units 702 (discrete or integrated microelectronic chips and/or separate but integrated processor cores), at least one memory device 704 (which may be integrated into systems or chips of the processing system 700), the display 706 (e.g., a touchscreen display, an OLED display with photodetectors, etc.), and other interfaces 708 (e.g., a keyboard interface). The memory device 704 generally includes both volatile memory (e.g., RAM) and non-volatile memory (e.g., flash memory). An operating system 710, such as one of the varieties of the Microsoft Windows® operating system, resides in the memory device 704 and is executed by at least one of the processor units 702, although it should be understood that other operating systems may be employed. Other features of the processing system 700 may include without limitation an image sensor, a sensing trigger (e.g., a pressure sensor or a proximity sensor), etc.

One or more applications 712, such as image scanning software, triggering software, sensor control instructions, etc., are loaded in the memory device 704 and executed on the operating system 710 by at least one of the processor units 702. The processing system 700 includes a power supply 716, which is powered by one or more batteries and/or other power sources and which provides power to other components of the processing system 700. The power supply 716 may also be connected to an external power source that overrides or recharges the built-in batteries or other power sources.

The processing system 700 includes one or more communication transceivers 730 to provide network connectivity (e.g., mobile phone network, Wi-Fi®, BlueTooth®, etc.). The processing system 700 also includes various other components, such as a positioning system 720 (e.g., a global positioning satellite transceiver), one or more accelerometers 722, one or more cameras 724, one or more audio interfaces 734 (e.g., such a microphone, an audio amplifier and speaker and/or audio jack), one or more antennas (732), and additional storage 728. Other configurations may also be employed.

In an example implementation, a mobile operating system, various applications, modules for image processing, pattern recognition, triggered image sensing, authentication, device access control, security, and other modules and services may be embodied by instructions stored in the memory device 704 and/or storage devices 728 and processed by the processing unit 702. Security, transaction, identity, policy, access control parameters, and other data may be stored in the memory device 704 and/or storage devices 728 as persistent datastores.

The processing system 700 may include a variety of tangible processor-readable storage media and intangible processor-readable communication signals. Tangible processor-readable storage can be embodied by any available media that can be accessed by the processing system 700 and includes both volatile and nonvolatile storage media, removable and non-removable storage media. Tangible processor-readable storage media excludes intangible communication signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared and other wireless media.

An example imaging system includes a display configured as a waveguide The display includes a cover glass and a volume holographic grating configured to diffract incident light from an object positioned outside the display. The diffracted incident light has an angle of incidence relative to the volume holographic grating that satisfies the Bragg condition. The volume holographic grating diffracts the incident light through the waveguide at a predetermined angle.

Another example imaging system of any preceding imaging system further includes an image sensor positioned at an output of the waveguide to capture the diffracted incident light propagated through the waveguide.

Another example imaging system of any preceding imaging system in which the display further includes a transparent or translucent substrate adjacent to the volume holographic grating.

Another example imaging system of any preceding imaging system in which the volume holographic grating selectively diffracts incident light having a normal angle of incidence with the volume holographic grating for transmission through the waveguide.

Another example imaging system of any preceding imaging system in which the volume holographic grating selectively diffracts incident light converging to the volume holographic grating for transmission through the waveguide.

Another example imaging system of any preceding imaging system in which the incident light is reflected from a feature of the object that is not in contact with the display.

Another example imaging system of any preceding imaging system in which angular selectivity in diffraction of incident light into the waveguide display is set during manufacturing by the angle of incidence of an object light relative to a reference light, the reference light having a normal angle of incidence at the volume holographic grating.

Another example imaging system of any preceding imaging system in which a waveguide exit distance of the diffracted light is set during manufacturing by an offset between an objective lens passing the object light to the volume holographic grating and a side of the volume holographic grating on which the reference light impinges during manufacturing.

Another example imaging system of any preceding imaging system further includes image processing circuitry coupled to an image sensor and configured to recognize a fingerprint image captured by the image sensor through the waveguide.

An example method includes diffracting, via a volume holographic grating, incident light from an object positioned outside a display. The display is configured as a waveguide. The diffracted incident light has an angle of incidence relative to the volume holographic grating that satisfies the Bragg condition. The diffracted light propagates the through the waveguide at a predetermined angle.

Another example method of any preceding example method further includes capturing the diffracted incident light propagated through the waveguide at an output of the waveguide.

Another example method of any preceding example method in which the display includes a cover glass and a transparent or translucent substrate adjacent to the volume holographic grating.

Another example method of any preceding example method in which the volume holographic grating selectively diffracts incident light having a normal angle of incidence with the volume holographic grating for transmission through the waveguide.

Another example method of any preceding example method in which the volume holographic grating selectively diffracts incident light converging to the volume holographic grating for transmission through the waveguide.

Another example method of any preceding example method in which the incident light is reflected from a feature of the object that is not in contact with the display.

Another example method of any preceding example method further includes setting angular selectivity in diffraction of incident light into the waveguide display during manufacturing based on an angle of incidence of an object light relative to a reference light, the reference light having a normal angle of incidence at the volume holographic grating.

Another example method of any preceding example method further includes setting the waveguide exit distance of the diffracted incident light during manufacturing by an offset between an objective lens passing the object light to the volume holographic grating and a side of the volume holographic grating on which the reference light impinges during manufacturing.

Another example method of any preceding example method further includes capturing an image of a fingerprint from the diffracted incident light propagated through the waveguide at the output of the waveguide and recognizing the fingerprint image captured by an image sensor through the waveguide.

An example electronic device includes a cover glass, a display panel layer, and a volume holographic grating configured to diffract incident light from an object positioned outside the display through a waveguide that includes the cover glass. The object is illuminated through the cover glass from the direction of the display panel layer. The diffracted incident light has an angle of incidence relative to the volume holographic grating that satisfies the Bragg condition. The volume holographic grating diffracts the incident light through the waveguide at a predetermined angle. An image sensor is positioned at an output of the waveguide to capture the diffracted incident light propagated through the waveguide.

Another example electronic device any preceding example electronic device further includes image processing circuitry coupled to an image sensor and configured to recognize a fingerprint image captured by the image sensor through the waveguide.

An example system includes means for diffracting incident light from an object positioned outside a display. The display is configured as a waveguide. The diffracted incident light has an angle of incidence relative to the volume holographic grating that satisfies the Bragg condition. Means for propagating transmits the diffracted incident light through the waveguide at a predetermined angle.

Another example system of any preceding example system further includes means for capturing the diffracted incident light propagated through the waveguide at an output of the waveguide.

Another example system of any preceding example system in which the display includes a cover glass and a transparent or translucent substrate adjacent to the volume holographic grating.

Another example system of any preceding example system in which the volume holographic grating selectively diffracts incident light having a normal angle of incidence with the volume holographic grating for transmission through the waveguide.

Another example system of any preceding example system in which the volume holographic grating selectively diffracts incident light converging to the volume holographic grating for transmission through the waveguide.

Another example system of any preceding example system in which the incident light is reflected from a feature of the object that is not in contact with the display.

Another example system of any preceding example system further includes means for setting angular selectivity in diffraction of incident light into the waveguide display during manufacturing based on an angle of incidence of an object light relative to a reference light, the reference light having a normal angle of incidence at the volume holographic grating.

Another example system of any preceding example system further includes means for setting the waveguide exit distance of the diffracted incident light during manufacturing by an offset between an objective lens passing the object light to the volume holographic grating and a side of the volume holographic grating on which the reference light impinges during manufacturing.

Another example system of any preceding example system further includes means for capturing an image of a fingerprint from the diffracted incident light propagated through the waveguide at the output of the waveguide and means for recognizing the fingerprint image captured by an image sensor through the waveguide.

Some embodiments may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a processor, cause the processor to perform methods and/or operations in accordance with the described embodiments. The executable processor program instructions may include any suitable type of code, such as source code, compiled code, interpreted code, executable code, static code, dynamic code, and the like. The executable processor program instructions may be implemented according to a predefined processor language, manner or syntax, for instructing a processor to perform a certain operation segment. The instructions may be implemented using any suitable high-level, low-level, object-oriented, visual, compiled and/or interpreted programming language.

The implementations described herein are implemented as logical steps in one or more processor systems. The logical operations may be implemented (1) as a sequence of processor-implemented steps executing in one or more processor systems and (2) as interconnected machine or circuit modules within one or more processor systems. The implementation is a matter of choice, dependent on the performance requirements of the processor system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. An imaging system comprising:

a display configured as a waveguide, the display including a cover glass and a volume holographic grating configured to diffract incident light from an object positioned outside the display, the diffracted incident light having an angle of incidence relative to the volume holographic grating that satisfies the Bragg condition, the volume holographic grating diffracting the incident light through the waveguide at a predetermined angle.

2. The imaging system of claim 1 further comprising:

an image sensor positioned at an output of the waveguide to capture the diffracted incident light propagated through the waveguide.

3. The imaging system of claim 1 wherein the display further includes a transparent or translucent substrate adjacent to the volume holographic grating.

4. The imaging system of claim 1 wherein the volume holographic grating selectively diffracts incident light having a normal angle of incidence with the volume holographic grating for transmission through the waveguide.

5. The imaging system of claim 1 wherein the volume holographic grating selectively diffracts incident light converging to the volume holographic grating for transmission through the waveguide.

6. The imaging system of claim 1 wherein the incident light is reflected from a feature of the object that is not in contact with the display.

7. The imaging system of claim 1 wherein angular selectivity in diffraction of incident light into the waveguide is set during manufacturing by the angle of incidence of an object light relative to a reference light, the reference light having a normal angle of incidence at the volume holographic grating.

8. The imaging system of claim 1 wherein a waveguide exit distance of the diffracted light is set during manufacturing by an offset between an objective lens passing the object light to the volume holographic grating and a side of the volume holographic grating on which the reference light impinges during manufacturing.

9. The imaging system of claim 2 further comprising:

image processing circuitry coupled to the image sensor and configured to recognize a fingerprint image captured by the image sensor through the waveguide.

10. A method comprising:

diffracting, via a volume holographic grating, incident light from an object positioned outside a display, the display being configured as a waveguide, the diffracted incident light having an angle of incidence relative to the volume holographic grating that satisfies the Bragg condition; and propagating the diffracted incident light through the waveguide at a predetermined angle.

11. The method of claim 10 further comprising:

capturing the diffracted incident light propagated through the waveguide at an output of the waveguide.

12. The method of claim 10 wherein the display includes a cover glass and a transparent or translucent substrate adjacent to the volume holographic grating.

13. The method of claim 10 wherein the volume holographic grating selectively diffracts incident light having a normal angle of incidence with the volume holographic grating for transmission through the waveguide.

14. The method of claim 10 wherein the volume holographic grating selectively diffracts incident light converging to the volume holographic grating for transmission through the waveguide.

15. The method of claim 10 wherein the incident light is reflected from a feature of the object that is not in contact with the display.

16. The method of claim 10 further comprising:

setting angular selectivity in diffraction of incident light into the waveguide during manufacturing based on an angle of incidence of an object light relative to a reference light, the reference light having a normal angle of incidence at the volume holographic grating.

17. The method of claim 10 further comprising:

setting the waveguide exit distance of the diffracted incident light during manufacturing by an offset between an objective lens passing the object light to the volume holographic grating and a side of the volume holographic grating on which the reference light impinges during manufacturing.

18. The method of claim 10 further comprising:

capturing an image of a fingerprint from the diffracted incident light propagated through the waveguide at the output of the waveguide; and recognizing the fingerprint image captured by an image sensor through the waveguide.

19. An electronic device comprising:

a cover glass;

a display panel layer;

a volume holographic grating configured to diffract incident light from an object positioned outside the display through a waveguide including the cover glass, the object being illuminated through the cover glass from the direction of the display panel layer, the diffracted incident light having an angle of incidence relative to the volume holographic grating that satisfies the Bragg condition, the volume holographic grating diffracting the incident light through the waveguide at a predetermined angle; and an image sensor positioned at an output of the waveguide to capture the diffracted incident light propagated through the waveguide.

20. The electronic device of claim 19 further comprising:

image processing circuitry coupled to the image sensor and configured to recognize a fingerprint image captured by the image sensor through the waveguide.

* * * * *